United States Patent
Nishide et al.

(10) Patent No.: US 8,810,240 B2
(45) Date of Patent: Aug. 19, 2014

(54) SEAT SLIDE POSITION DETECTION DEVICE FOR VEHICLE

(75) Inventors: Harutomi Nishide, Wako (JP); Yozo Furuta, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 423 days.

(21) Appl. No.: 13/183,434

(22) Filed: Jul. 15, 2011

(65) Prior Publication Data

US 2012/0018608 A1 Jan. 26, 2012

(30) Foreign Application Priority Data

Jul. 21, 2010 (JP) .................................. 2010-163815

(51) Int. Cl.
 *G01B 7/14* (2006.01)
(52) U.S. Cl.
 USPC .................................................... 324/207.24
(58) Field of Classification Search
 USPC .................................................... 324/207.24
 See application file for complete search history.

(56) References Cited

U.S. PATENT DOCUMENTS

2002/0125396 A1* 9/2002 Kume et al. ................... 248/429

FOREIGN PATENT DOCUMENTS

| JP | 59-01634 U | 1/1984 |
| JP | 2005-041245 | 2/2005 |
| JP | 2006-281813 | 10/2006 |

OTHER PUBLICATIONS

Japanese Office Action for corresponding JP Application No. 2010-163815, Jun. 22, 2012.

* cited by examiner

*Primary Examiner* — Reena Aurora
(74) *Attorney, Agent, or Firm* — Mori & Ward, LLP (57) ABSTRACT

A seat slide position detection device for a vehicle includes a lower rail attached to a vehicle floor. The lower rail has one side and another side opposite to the one side in the width direction. The one side includes a side surface and an upward wall portion extending upward along the side surface. An upper rail is supported by the lower rail and slidable with respect to the lower rail in the longitudinal direction of the lower rail. A detection target portion is provided in the upward wall portion of the lower rail in a predetermined range in the longitudinal direction of the lower rail. A position sensor is disposed at the upper rail between the upper rail and the upward wall portion to face the detection target portion.

10 Claims, 4 Drawing Sheets

SEAT SLIDE POSITION DETECTION DEVICE FOR VEHICLE

CROSS-REFERENCE TO RELATED APPLICATIONS

The present application claims priority under 35 U.S.C. §119 to Japanese Patent Application No. 2010-163815, filed on Jul. 21, 2010, entitled "Seat Slide Position Detection Device for Vehicle." The contents of this application are incorporated herein by reference in their entirety.

BACKGROUND OF THE INVENTION

1. Field of the Invention

The present invention relates to a seat slide position detection device for a vehicle.

2. Description of the Related Art

In an automobile, the driver's seat, the front passenger seat, or the like is equipped with an air bag device to protect the occupant of the seat in the event of a collision of the vehicle. The air bag device is normally stored in the steering wheel or the instrument panel. Upon detection of an impact generated in the collision of the vehicle, an explosion takes place in an inflator and inflates the air bag into a balloon shape. Thereby, the occupant is prevented from striking against the steering wheel or the instrument panel in the collision of the vehicle.

Meanwhile, if the air bag is fully deployed with constant operating force, preferred effects of the air bag may not be obtained, depending on the physical size of the occupant. In view of this, an air bag device has been developed in recent years, which uses the seat position in a vehicle as a guide in estimating the physical size of the occupant and deploys the air bag in a stepwise manner in accordance with the seat position in the vehicle, to thereby obtain the effects of the air bag. Further, to detect the seat position required for the air bag device, a variety of seat slide position detection devices for a vehicle have been developed which use a magnetic sensor.

For example, according to Japanese Unexamined Patent Application Publication No. 2006-281813, an upper rail fixed to a seat is slidably assembled to a lower rail fixed to the floor of a vehicle. The lower rail is bent and formed into a substantially U-shape having an open upper portion. Meanwhile, the upper rail is bent and formed into a substantially U-shape having an open lower portion. A proximity sensor (corresponding to the position sensor of the present application) is provided inside the upper rail as a position detection device. Further, the proximity sensor has a detection surface facing a side surface of a locking plate provided inside the lower rail. The proximity sensor detects the side surface of the locking plate to thereby detect the seat position.

Herein, in the case of an electric sliding seat device, a motor, a ball screw mechanism, and so forth for sliding a seat may be provided inside the upper rail and the lower rail. Therefore, if the electric sliding seat device has a proximity sensor disposed inside the upper rail, as in the above patent application publication, the proximity sensor may interfere with the motor, the ball screw mechanism, and so forth provided inside the upper rail. Therefore, the seat slide position detection device for a vehicle according to the above patent application publication may not be applicable to the electric sliding seat device.

In view of the above, according to Japanese Unexamined Patent Application Publication No. 2005-41245, a seat slide sensor (corresponding to the position sensor of the present application) for detecting the seat position in the anteroposterior direction of a vehicle is provided outside the upper rail. The seat slide sensor is mounted on the upper rail such that the lower surface of the seat slide sensor (corresponding to the sensor detection surface of the present application) is disposed above and separated from the lower rail (corresponding to the detection target portion of the present application) by a predetermined distance. Further, the seat slide sensor is attached with a protection cover surrounding the sensor. The protection cover includes a first wall portion and a second wall portion. The first wall portion is positioned above and separated from the seat slide sensor by a first predetermined distance. The second wall portion is positioned lateral to and separated from the seat slide sensor by a second predetermined distance, and extends lower than the seat slide sensor. Further, the seat slide sensor has a detection surface facing the upper surface of the lower rail, and detects the presence or absence of the lower rail, to thereby detect the seat position.

A seat slide position detection device for a vehicle having a seat slide sensor disposed outside the upper rail and the lower rail, as in the second patent application publication, is expected to be applicable to the electric sliding seat device.

SUMMARY OF THE INVENTION

According to one aspect of the present invention, a seat slide position detection device for a vehicle includes a lower rail, an upper rail, a detection target portion and a position sensor. The lower rail is attached to a vehicle floor and has a longitudinal direction and a width direction substantially perpendicular to the longitudinal direction. The lower rail has one side and another side opposite to the one side in the width direction. The one side includes a side surface and an upward wall portion extending upward along the side surface. The upper rail is supported by the lower rail and slidable with respect to the lower rail in the longitudinal direction of the lower rail. The detection target portion is provided in the upward wall portion of the lower rail in a predetermined range in the longitudinal direction of the lower rail. The position sensor is disposed at the upper rail between the upper rail and the upward wall portion to face the detection target portion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

With reference to the drawings, description will be made below of a seat slide position detection device for a vehicle (hereinafter referred to as "slide position detection device") according to an embodiment of the present invention, wherein like reference numerals designate corresponding or identical elements throughout the various drawings.

Figure 1:
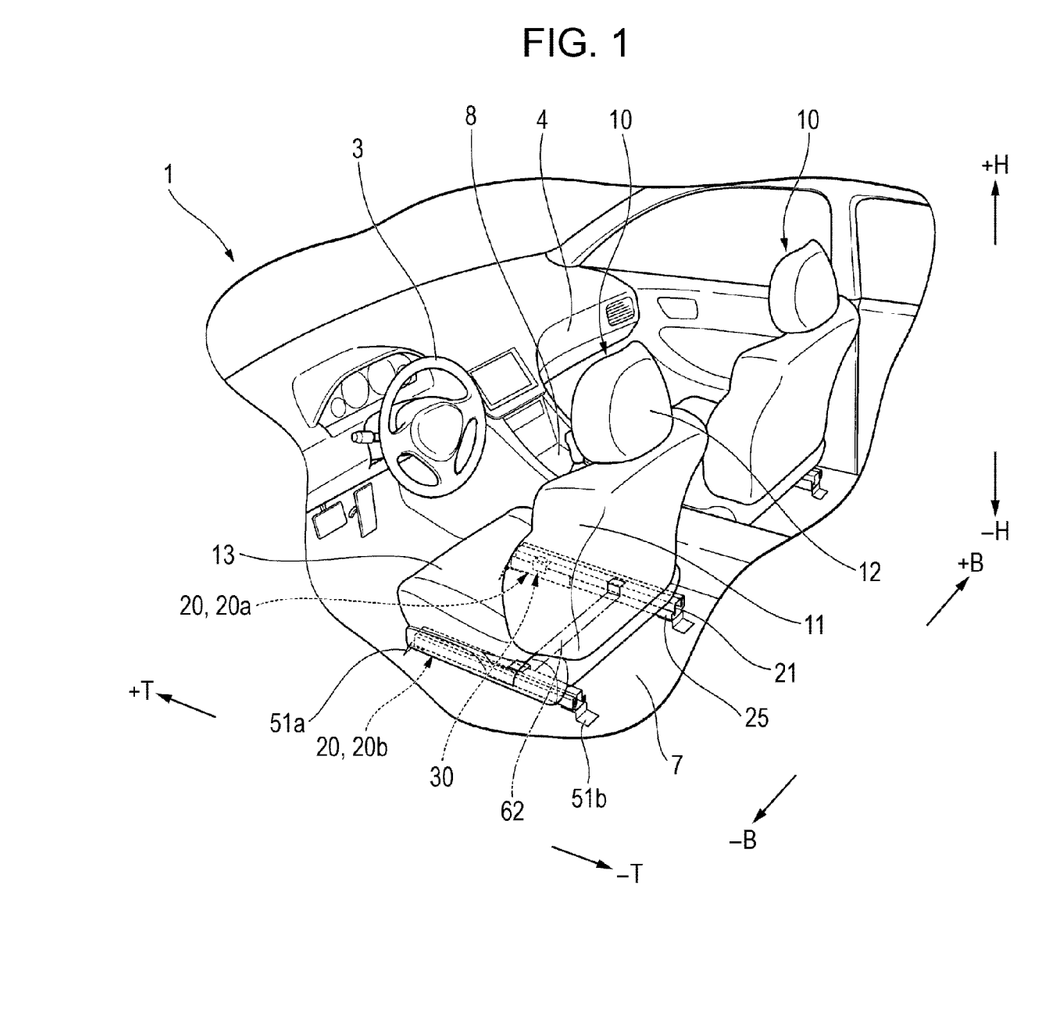
FIG. 1 is an explanatory diagram of a vehicle including a seat slide position detection device for a vehicle.

FIG. 1 is an explanatory diagram of a vehicle 1 including a slide position detection device 30. In the following description, the anteroposterior direction of the vehicle 1 (corresponding to the longitudinal direction of the lower rail in the claims) will be referred to as the T direction, and the front side and the rear side in the direction will be referred to as the +T side and the −T side, respectively. The horizontal direction of the vehicle 1 (corresponding to the width direction of the lower rail in the claims) will be referred to as the B direction, and the right side and the left side (corresponding to the one side in the claims) in the direction will be referred to as the +B side and the −B side, respectively. The height direction of the vehicle 1 will be referred to as the H direction, and the upper side and the lower side in the direction will be referred to as the +H side and the −H side, respectively. Further, in the present embodiment, description will be made of the vehicle 1, in which the driver's seat and the front passenger seat are disposed on the left side and the right side of the vehicle 1, respectively. Further, description will be made of a case in which the slide position detection device 30 is provided on the driver's seat side.

Seat Device

As illustrated in FIG. 1, the vehicle 1 of the present embodiment includes a pair of seat devices 10 provided on the driver's seat side and the front passenger seat side. The pair of seat devices 10 are the same in structure. In the following, therefore, description will be made of the seat device 10 on the driver's seat side, and description of the seat device 10 on the front passenger seat side will be omitted.

As illustrated in FIG. 1, the seat device 10 is mainly formed by a seat cushion 13, a seat back 11, and a headrest 12. The seat cushion 13 is a member for supporting the buttocks and thighs of a user when seated. The seat cushion 13 has a seat frame (not illustrated) provided therein, and is connected to an upper rail 21 (see FIG. 2) of a slide mechanism 20 described later. The seat cushion 13 connected to the upper rail 21 is attached, via the later-described slide mechanism 20, to a vehicle floor 7 to be movable in the T direction.

The seat back 11 is a member for supporting the dorsal and lumbar regions of the back of the user when seated. The seat back 11 is provided on the −T side of the seat cushion 13, and stands upright toward the +H side. The −H side of the seat back 11 is coupled to the −T side of the seat cushion 13 via a not-illustrated reclining mechanism. Further, the seat back 11 tilts about the axis of rotation of the reclining mechanism extending in the B direction. The headrest 12 is a member for supporting the neck and head of the user when seated. On the +H side of the seat back 11, the headrest 12 is supported to be movable up and down so as to approach and separate from the seat back 11.

Center Console

A center console 8 is disposed between the pair of seat devices 10. The center console 8 is formed on the +H side of a center tunnel (not illustrated) in the vehicle interior. In a substantial center of the vehicle floor 7 in the B direction, the center console 8 is formed to extend in the T direction and project toward the +H side.

Slide Mechanism

The slide position detection device 30 of the present embodiment is mainly formed by the slide mechanism 20, a position sensor 40 (see FIG. 3A), and an L-shaped member 35. The slide mechanism 20 includes a lower rail 25 (see FIGS. 3A and 3B), the upper rail 21 (see FIGS. 3A and 3B), and an electric sliding device 60 (see FIGS. 3A and 3B). The L-shaped member 35 includes a detection target portion 36a (see FIG. 3A) and a vertical wall portion 36.

The slide mechanism 20 will be first described. As illustrated in FIG. 1, the vehicle 1 of the present embodiment includes a left and right pair of slide mechanisms 20 (an inner slide mechanism 20a on the +B side and an outer slide mechanism 20b on the −B side) for supporting the seat device 10 to be slidable in the T direction. The inner slide mechanism 20a and the outer slide mechanism 20b of the present embodiment are the same in main structure, except for the slide position detection device 30. In the following, therefore, description will be made of the inner slide mechanism 20a, and description of the outer slide mechanism 20b will be omitted.

Figure 2:
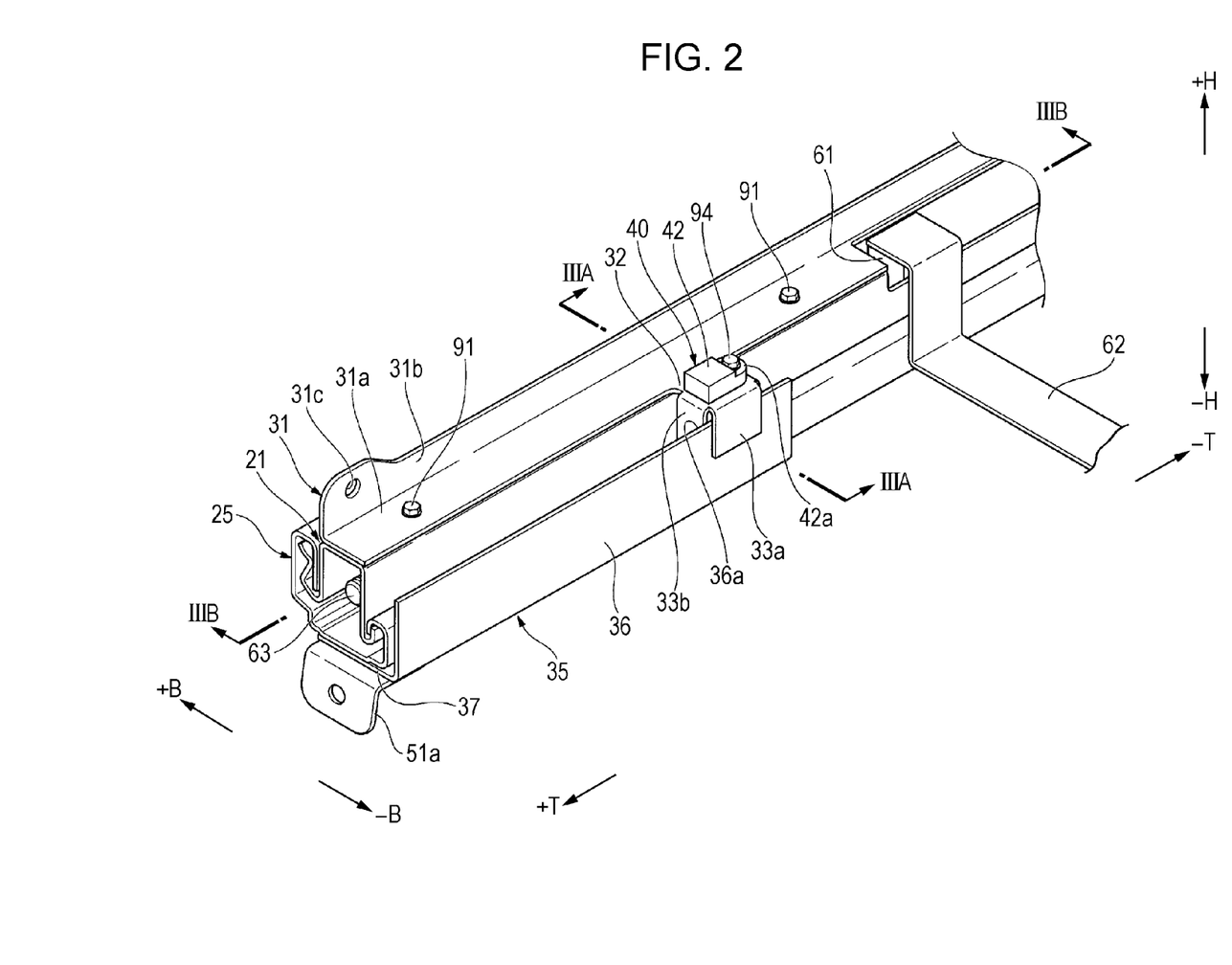
FIG. 2 is a perspective view of a slide mechanism and the seat slide position detection device for a vehicle.
Figure 3A:
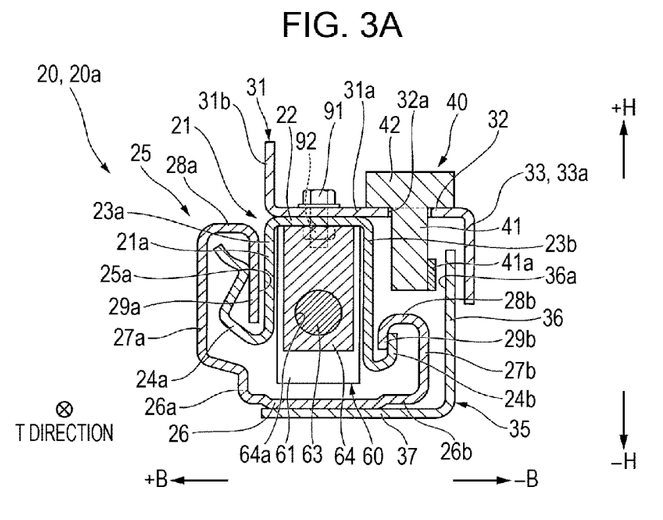
FIGS. 3A and 3B are explanatory diagrams of the slide mechanism and the seat slide position detection device for a vehicle, FIG. 3A being a cross-sectional view of FIG. 2 taken along the line IIIA-IIIA, and FIG. 3B being a cross-sectional view of FIG. 2 taken along the line IIIB-IIIB.
Figure 3B:
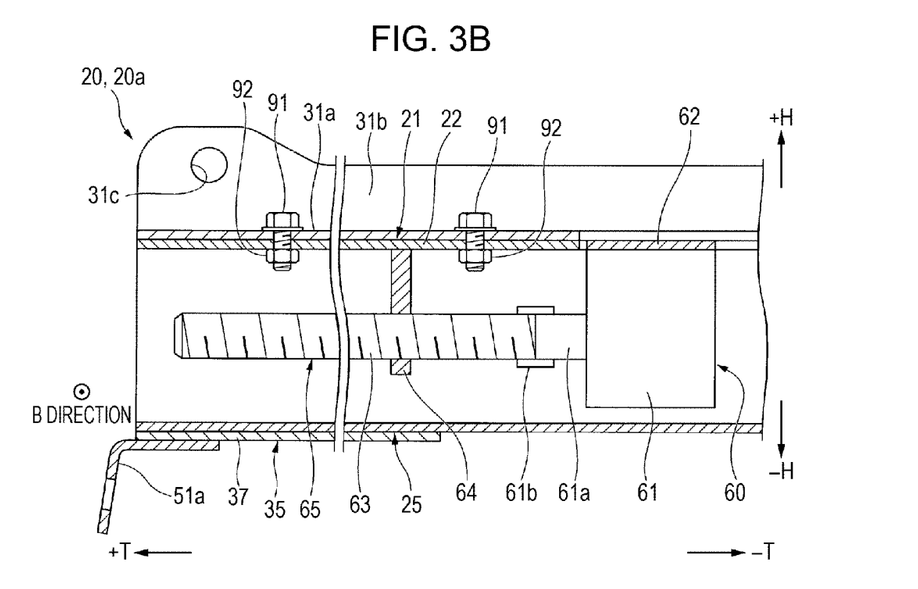
Figure 4:
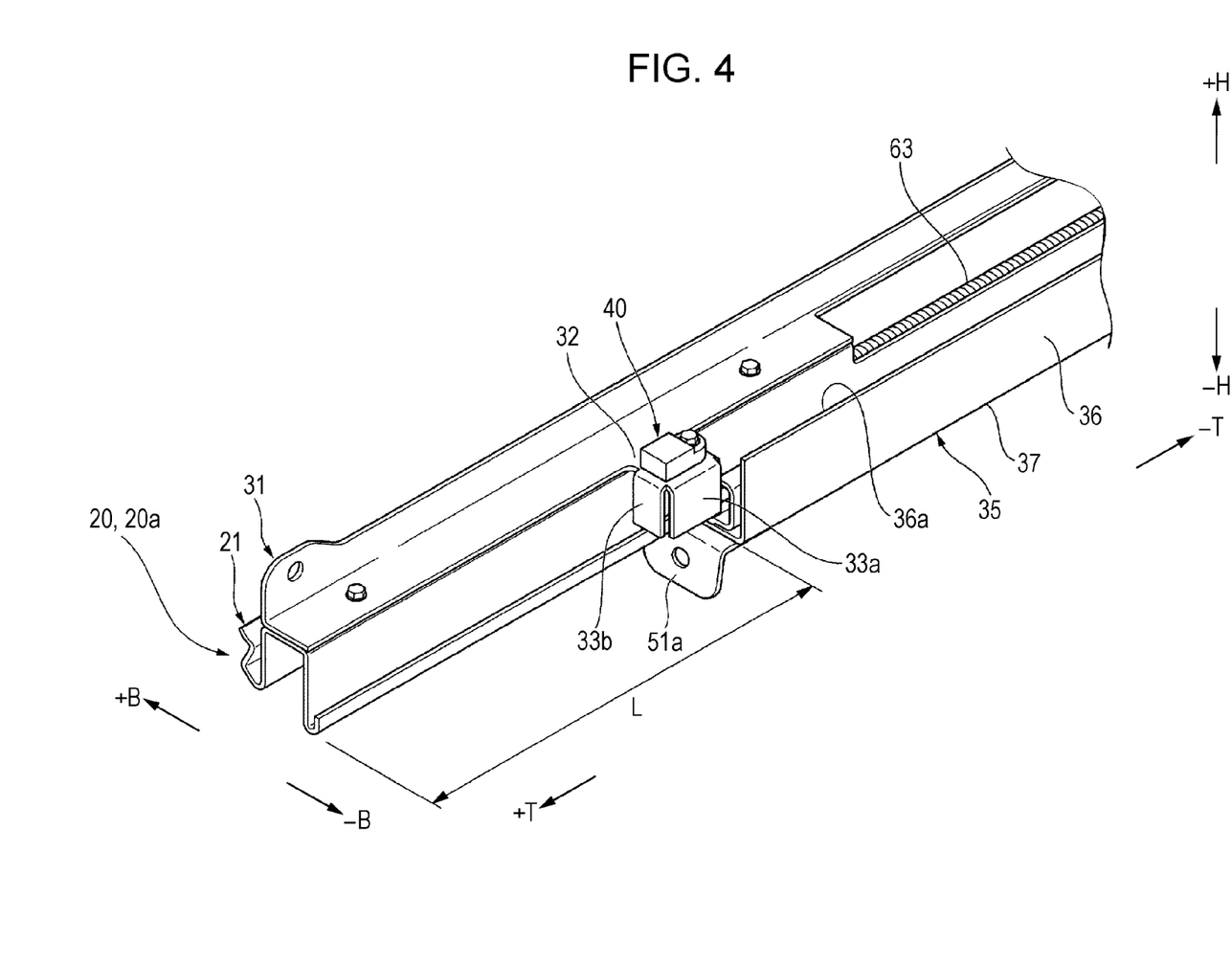
FIG. 4 is an explanatory diagram in which a seat device is located closest to the front side of a vehicle.

FIG. 2 is a perspective view of the inner slide mechanism 20a and the slide position detection device 30. FIGS. 3A and 3B are explanatory diagrams of the inner slide mechanism 20a and the slide position detection device 30. FIG. 3A is a cross-sectional view of FIG. 2 taken along the line IIIA-IIIA, and FIG. 3B is a cross-sectional view of FIG. 2 taken along the line IIIB-IIIB. FIG. 4 is an explanatory diagram of the inner slide mechanism 20a and the slide position detection device 30, in which the seat device 10 is located closest to the front side of the vehicle 1. As illustrated in FIGS. 2 to 4, the inner slide mechanism 20a mainly includes the lower rail 25 attached to the vehicle floor 7, the upper rail 21 supported relative to the lower rail 25 to be slidable in the T direction, and the electric sliding device 60 disposed inside the lower rail 25 and the upper rail 21.

Lower Rail of Slide Mechanism

The lower rail 25 is a member made of a metal, such as iron, and extending in the T direction, and is molded by pressing or the like. As illustrated in FIG. 3A, the lower rail 25 has a substantially C-shape having an opening on the +H side, as viewed in the T direction. Further, a flat plate-like bottom portion 26 is disposed on the −H side of the lower rail 25. The bottom portion 26 is connected to a front mounting bracket 51a and a rear mounting bracket 51b (see FIG. 1) described later. Further, a roller (not illustrated) provided to the later-described upper rail 21 is in sliding contact with the +H side surface of the bottom portion 26.

The lower rail 25 includes a +B side wall portion 27a standing upright from the +B side of the bottom portion 26 toward the +H direction, and a −B side wall portion 27b standing upright from the −B side of the bottom portion 26 toward the +H direction. The +B side wall portion 27a stands upright to a height substantially the same as the height of an upper wall portion 22 of the later-described upper rail 21. Meanwhile, the −B side wall portion 27b stands upright to a height substantially half the height of the upper wall portion 22 of the upper rail 21. Bent portions 26a and 26b may be formed between the bottom portion 26 and the +B side wall portion 27a and between the bottom portion 26 and the −B side wall portion 27b, respectively, as in the present embodiment. With the bent portions 26a and 26b thus formed, it is possible to increase the section modulus of the lower rail 25, and to enhance the strength of the lower rail 25.

The lower rail 25 includes a +B side upper wall portion 28a extending inward from the +H side of the +B side wall portion 27a toward the opposite −B side wall portion 27b, and a −B side upper wall portion 28b extending inward from the +H side of the −B side wall portion 27b toward the opposite +B side wall portion 27a. As described above, the +B side wall portion 27a of the lower rail 25 stands upright to a height substantially the same as the height of the upper wall portion 22 of the upper rail 21. Therefore, the +H side surface of the +B side upper wall portion 28a of the lower rail 25 and the +H side surface of the upper wall portion 22 of the upper rail 21 are substantially on the same plane.

Meanwhile, the −B side wall portion 27b of the lower rail 25 stands upright to a height substantially half the height of the upper wall portion 22 of the upper rail 21. On the +H side of the −B side upper wall portion 28b of the lower rail 25, therefore, a space is formed between the −B side upper wall portion 28b and a support plate 32 described later. In this space, a sensor portion 41 and a sensor detection surface 41a of the later-described position sensor 40 can be disposed.

The lower rail 25 includes a +B side regulation portion 29a extending from the inner end of the +B side upper wall portion 28a toward the −H side, and a −B side regulation portion 29b extending from the inner end of the −B side upper wall portion 28b toward the −H side. The +B side regulation portion 29a and the −B side regulation portion 29b are disposed to be separated from each other in the B direction. Thereby, a slit-like opening portion 25a extending in the T direction is formed in a substantial center of the lower rail 25 in the B direction. The separation distance in the B direction between the +B side regulation portion 29a and the −B side regulation portion 29b is set to be slightly more than the width in the B direction of a body portion 21a of the later-described upper rail 21. It is therefore possible to dispose the body portion 21a of the upper rail 21 between the +B side regulation portion 29a and the −B side regulation portion 29b. Accordingly, the upper rail 21 is allowed to move in the T direction along the opening portion 25a of the lower rail 25, and the movement of the upper rail 21 in the B direction is regulated.

Further, each of the +B side regulation portion 29a and the −B side regulation portion 29b is formed to be separated from the bottom portion 26 in the H direction by a predetermined distance. It is thereby possible to dispose a +B side sliding portion 24a and a −B side sliding portion 24b of the later-described upper rail 21 between the +B side regulation portion 29a and the bottom portion 26 and between the −B side regulation portion 29b and the bottom portion 26, respectively. Accordingly, it is possible to regulate the movement of the upper rail 21 in the H direction. The separation distance between the +B side regulation portion 29a and the bottom portion 26 and the separation distance between the −B side regulation portion 29b and the bottom portion 26 are set as appropriate in accordance with the shape of the +B side sliding portion 24a and the shape of the −B side sliding portion 24b, respectively.

Upper Rail of Slide Mechanism

The upper rail 21 is a member made of a metal, such a iron, and extending in the T direction, and is molded by pressing or the like. As illustrated in FIG. 3A, the body portion 21a of the upper rail 21 has a substantially U-shape having an opening on the −H side, as viewed in the T direction, and includes the upper wall portion 22, a +B side wall portion 23a, and a −B side wall portion 23b. The +B side wall portion 23a and the −B side wall portion 23b stand upright from the opposite ends in the B direction of the upper wall portion 22 toward the −H side. The +B side wall portion 23a and the −B side wall portion 23b are formed to be separated from each other by a predetermined distance. The separation distance between the +B side wall portion 23a and the −B side wall portion 23b is set as appropriate in accordance with the width in the B direction of the electric sliding device 60 provided inside the lower rail 25 and the upper rail 21. Details of the electric sliding device 60 will be described later.

The −H side of the +B side wall portion 23a is formed with the +B side sliding portion 24a bent toward the +B side and the +H side. Further, the −H side of the −B side wall portion 23b is formed with the −B side sliding portion 24b bent toward the −B side and the +H side. The not-illustrated roller is disposed between the bottom portion 26 of the lower rail 25 and the +B side sliding portion 24a and the −B side sliding portion 24b. The roller rotates between the bottom portion 26 of the lower rail 25 and the +B side sliding portion 24a and the −B side sliding portion 24b. Thereby, the upper rail 21 is allowed to slide in the T direction.

The upper rail 21 is attached to the seat device 10. Specifically, the upper rail 21 is attached, via a seat attachment member 31 provided on the +H side of the upper wall portion 22, to the seat frame provided inside the seat cushion 13. The seat attachment member 31 is a member made of a metal, such as iron, and extending in the T direction, and is molded by pressing or the like. As illustrated in FIGS. 3A and 3B, the seat attachment member 31 is substantially L-shaped, as viewed in the T direction, and includes an upper rail attachment portion 31a disposed on the −H side and a seat attachment portion 31b standing upright from the +B side of the upper rail attachment portion 31a toward the +H direction.

The seat attachment member 31 is attached to the upper wall portion 22 of the upper rail 21. Specifically, the upper rail attachment portion 31a of the seat attachment member 31 is disposed to be superimposed on the upper wall portion 22 of the upper rail 21. Then, bolts 91 are inserted into attachment holes formed in the upper rail attachment portion 31a, and are fastened to nuts 92 provided to the upper wall portion 22 of the upper rail 21. Thereby, it is possible to fasten the upper rail attachment portion 31a and the upper wall portion 22 together, and thus to attach the seat attachment member 31 to the upper wall portion 22 of the upper rail 21. The seat attachment member 31 may be attached to the upper wall portion 22 of the upper rail 21 by welding or the like.

Further, the seat attachment portion 31b of the seat attachment member 31 is formed with an attachment hole 31c. The seat attachment member 31 is attached to the seat device 10 with a bolt (not illustrated) inserted into the attachment hole 31c to fix the seat frame (not illustrated) of the seat device 10 and the seat attachment portion 31b to each other. In the present embodiment, the above-described seat attachment member 31 and the later-described support plate 32, first protection plate 33a, and second protection plate 33b of the slide position detection device 30 are integrally formed.

Electric Sliding Device of Slide Mechanism

As illustrated in FIG. 3B, inside the lower rail 25 and the upper rail 21 described above, the electric sliding device 60 is disposed which moves the seat device 10 in the T direction via the upper rail 21. The electric sliding device 60 is mainly formed by a motor 61 and a ball screw mechanism 65 including a ball screw 63 and a nut 64.

The motor 61 is disposed inside the lower rail 25 and the upper rail 21 by a motor bracket 62. As illustrated in FIGS. 1 and 2, the motor bracket 62 is disposed on the −T side of the lower rail 25, and is fixed on the side of the vehicle floor 7. A stepping motor or a DC (Direct Current) servo motor, for example, is used as the motor 61. Upon operation of a seat adjustment switch (not illustrated) provided to the seat device 10, the motor 61 is driven to rotate a shaft 61a.

The ball screw 63 is disposed coaxially with the axis of rotation of the shaft 61a of the motor 61. The ball screw 63 is coupled to the shaft 61a with a coupling 61b, and extends in the T direction. The nut 64 is fixed to the upper wall portion 22 of the upper rail 21 by welding or the like. The ball screw 63 is inserted through an insertion hole 64a of the nut 64. The separation distance between a +T side end portion of the ball screw 63 and the nut 64 is set to be more than a maximum moving distance L (see FIG. 4) in the T direction of the seat device 10. Thereby, it is possible to ensure the maximum moving distance L of the seat device 10.

As described above, the motor 61 is fixed on the side of the vehicle floor 7. It is therefore possible to move the nut 64 in the T direction by driving the motor 61 and thereby driving the ball screw 63 to rotate. It is also possible to move the upper rail 21 in the T direction in conjunction with the nut 64. The upper rail 21 is thus allowed to move in the T direction. Therefore, the seat device 10 connected to the upper rail 21 is also allowed to move in the T direction.

The above-described slide mechanism 20 is fixed to the vehicle floor 7 via the front mounting bracket 51a and the rear mounting bracket 51b. Each of the front mounting bracket 51a and the rear mounting bracket 51b is a plate-like member made of a metal, such as iron, and is molded by pressing or the like. The front mounting bracket 51a of the present embodiment is formed to be substantially L-shaped, as viewed in the B direction. The rear mounting bracket 51b of the present embodiment is formed to be substantially crank shaped, as viewed in the B direction. The respective shapes of the front mounting bracket 51a and the rear mounting bracket 51b are selected as appropriate in accordance with the shapes of the vehicle floor 7 of various vehicle types.

Position Sensor of Slide Position Detection Device

Subsequently, description will be made of the slide position detection device 30 provided to the above-described slide mechanism 20. As illustrated in FIGS. 2 and 3A, the slide position detection device 30 of the present embodiment includes the position sensor 40 disposed on the side of the upper rail 21. The position sensor 40 is a magnetic sensor using, for example, a hall IC (Integrated Circuit), and mainly includes the sensor portion 41 and a body portion 42.

The sensor portion 41 is formed into, for example, a cylindrical shape, and has a −H side end portion provided with the sensor detection surface 41a facing the −B side. The sensor portion 41 includes a hall element (not illustrated) on the +B side of the sensor detection surface 41a. Further, the sensor portion 41 includes, on the +B side of the hall element, a bias magnet (not illustrated) which generates a magnetic flux passing through the hall element. If a magnetic material approaches or separates from the sensor detection surface 41a of the position sensor 40, the density of the magnetic flux passing through the hall element changes, and the output from the hall element changes in accordance with the change in density of the magnetic flux. It is therefore possible to detect, on the basis of the output from the hall element, whether or not the detection target portion 36a made of a magnetic material is present on the −B side of the sensor detection surface 41a. A specific method of detecting the position of the seat device 10 in the present embodiment will be described later.

The body portion 42 has, for example, a substantially rectangular shape, as viewed in the H direction, and includes an integrated circuit or the like for amplifying the signal of the hall element. Further, the body portion 42 is formed with a sensor attachment portion 42a. The sensor attachment portion 42a is formed with an attachment hole (not illustrated) piercing through the position sensor 40 in the H direction. With a bolt 94 inserted into the attachment hole and fastened to the later-described support plate 32, it is possible to fix the position sensor 40 to the support plate 32. The body portion 42 is provided with a not-illustrated connector. The connector outputs the amplified signal of the hall element. With the signal output to a not-illustrated controller, the controller is allowed to recognize the seat position and adjust the deployment of the air bag in accordance with the seat position.

Detection Target Portion of Slide Position Detection Device

As illustrated in FIGS. 2 to 3B, the slide position detection device 30 of the present embodiment includes the L-shaped member 35 attached to the lower rail 25 and including the detection target portion 36a detected by the position sensor 40. The L-shaped member 35 is a member made of a magnetic material, such as iron, and is molded by pressing or the like. As described above, if a magnetic material approaches or separates from the position sensor 40, the density of the magnetic flux passing through the hall element changes, and the output from the hall element changes in accordance with the change in density of the magnetic flux. With the L-shaped member 35 made of a magnetic material, therefore, it is possible to detect, on the basis of the change in output from the hall element, the positional relationship between the position sensor 40 and the L-shaped member 35.

The L-shaped member 35 includes a flat plate-like lower rail attachment portion 37, the vertical wall portion 36 formed on the −B side of the lower rail attachment portion 37 and standing upright toward the +H side, and the detection target portion 36a provided in the vertical wall portion 36. The lower rail attachment portion 37 is connected to the −H side surface of the bottom portion 26 of the lower rail 25 by, for example, spot welding or the like. In the present embodiment, the lower rail attachment portion 37 is disposed between the lower rail 25 and the front mounting bracket 51a.

The vertical wall portion 36 stands upright from the −B side of the lower rail attachment portion 37 toward the +H side along the −B side wall portion 27b of the lower rail 25. Herein, a +H side end portion of the vertical wall portion 36 is disposed at a position higher than the sensor detection surface 41a of the position sensor 40. With the +H side end portion of the vertical wall portion 36 thus disposed at a position higher than the sensor detection surface 41a of the position sensor 40, it is possible to reliably detect the detection target portion 36a with the sensor detection surface 41a, and to protect the sensor detection surface 41a from external force acting in the B direction. The vertical wall portion 36 thus covers the sensor detection surface 41a from the −H side. Thereby, a foreign substance is not attracted from the surface of the vehicle floor 7, and thus is prevented from adhering to the position sensor 40. Further, the +H side end portion of the vertical wall portion 36 is formed with a slight gap provided between the +H side end portion of the vertical wall portion 36 and the −H side surface of the support plate 32. Accordingly, it is possible to reliably prevent a foreign substance from entering between the sensor detection surface 41a and the detection target portion 36a.

A portion of the vertical wall portion 36 facing the sensor detection surface 41a of the position sensor 40 forms the detection target portion 36a. The length in the T direction from a +T side end portion to a −T side end portion of the detection target portion 36a is set to be less than the maximum moving distance L in the T direction of the seat device 10. If the seat device 10 moves from the −T side toward the +T side by the maximum moving distance L, therefore, the detection target portion 36a is absent on the −B side of the sensor detection surface 41a. Herein, between the presence and absence of the detection target portion 36a on the −B side of the sensor detection surface 41a, the density of the magnetic flux passing through the hall element is different, and thus the output of the signal from the hall element is also different.

Specifically, if the detection target portion 36a is present on the −B side of the sensor detection surface 41a, the sensor detection surface 41a and the detection target portion 36a face each other while being separated from each other by a predetermined distance. Therefore, the density of the magnetic flux passing through the hall element is maintained at a constant value. Accordingly, the output from the position sensor 40 is maintained at a predetermined value. Meanwhile, if the detection target portion 36a is absent on the −B side of the sensor detection surface 41a, the density of the magnetic flux passing through the hall element changes, and the output from the hall element changes from the above-described predetermined value in accordance with the change in density of the magnetic flux. The output from the position sensor 40 thus changes from the above-described predetermined value. Therefore, the controller is allowed to determine whether or not the seat device 10 is disposed closest to the +T side.

Support Plate of Slide Position Detection Device

As illustrated in FIGS. 2 and 3A, the above-described position sensor 40 is attached to the support plate 32. The support plate 32 of the present embodiment is formed integrally with the seat attachment member 31. Specifically, the support plate 32 has a substantially rectangular shape, as viewed in the H direction, and is formed by a part of the upper rail attachment portion 31a of the seat attachment member 31 projecting toward the −B side.

The length from a +T side end portion of the lower rail 25 to a −T side end portion of the support plate 32 in a state in which the seat device 10 is located closest to the −T side is set to be substantially the same as or slightly less than the maximum moving distance L in the T direction of the seat device 10. Thereby, as described later, if the seat device 10 has moved toward the +T side by the maximum moving distance L and is located closest to the +T side, the detection target portion 36a is absent on the −B side of the sensor detection surface 41a. Therefore, the controller is allowed to determine whether or not the seat device 10 is disposed closest to the +T side.

First Protection Plate of Slide Position Detection Device

Further, the first protection plate 33a is formed on the −B side of the support plate 32 of the present embodiment. In the present embodiment, the first protection plate 33a is formed integrally with the support plate 32, and is formed by a −B side end portion of the support plate 32 bent toward the −H side. The first protection plate 33a has a substantially rectangular shape, as viewed in the B direction, and is formed to cover the sensor detection surface 41a of the position sensor 40. Specifically, the length in the T direction of the first protection plate 33a is set to be more than the length in the T direction of the sensor portion 41 of the position sensor 40. The length in the H direction of the first protection plate 33a is set to be substantially the same as or slightly more than the distance from the +H side surface of the support plate 32 to a −H side end portion of the position sensor 40. Further, a −H side end portion of the first protection plate 33a is disposed further toward the −H side than the sensor detection surface 41a of the position sensor 40. Thereby, it is possible to protect the sensor detection surface 41a while preventing the entry of a foreign substance in the H direction.

The first protection plate 33a is formed to be disposed further toward the −B side than the position detectable by the position sensor 40. It is thereby possible to prevent the position sensor 40 from detecting the first protection plate 33a. Further, the separation distance in the B direction between the first protection plate 33a and the sensor detection surface 41a of the position sensor 40 is set to be more than the plate thickness in the B direction of the detection target portion 36a of the L-shaped member 35. Accordingly, it is possible to dispose the detection target portion 36a of the L-shaped member 35 between the first protection plate 33a and the sensor detection surface 41a of the position sensor 40.

As illustrated in FIG. 3A, in the slide position detection device 30 of the present embodiment, the first protection plate 33a, the vertical wall portion 36, and the sensor detection surface 41a are arranged in this order from the −B side toward the +B side. It is therefore possible to protect the sensor detection surface 41a of the position sensor 40 with the first protection plate 33a and the vertical wall portion 36. Accordingly, it is possible to reliably protect the sensor detection surface 41a of the position sensor 40 from external force acting in the B direction. Further, the sensor detection surface 41a is covered from the +H side by the first protection plate 33a. It is therefore possible to prevent a foreign substance from entering between the sensor detection surface 41a and the detection target portion 36a.

Second Protection Plate of Slide Position Detection Device

Further, the second protection plate 33b is formed on the +T side of the support plate 32 of the present embodiment. The second protection plate 33b is also formed integrally with the support plate 32, similarly to the first protection plate 33a. The second protection plate 33b is formed by a +T side end portion of the support plate 32 bent toward the −H side. The second protection plate 33b has a substantially rectangular shape, as viewed in the T direction, and is formed to cover the sensor detection surface 41a of the position sensor 40. Specifically, the width in the B direction of the second protection plate 33b is set to be more than the width in the B direction of the sensor portion 41 of the position sensor 40, and to be slightly less than the separation distance between the vertical wall portion 36 of the L-shaped member 35 and the body portion 21a of the upper rail 21.

Further, the length in the H direction of the second protection plate 33b is set to be slightly more than the distance from the +H side surface of the support plate 32 to the −H side end portion of the position sensor 40. Further, the length in the H direction of the second protection plate 33b is set to be slightly less than the separation distance between the +H side surface of the support plate 32 and the +H side surface of the −B side upper wall portion 28b of the lower rail 25. Accordingly, the gap between the second protection plate 33b and the upper rail 21, the gap between the second protection plate 33b and the vertical wall portion 36, and the gap between the second protection plate 33b and the lower rail 25 are minute. It is therefore possible to prevent a foreign substance from entering in the T direction and adhering to the position sensor 40. Accordingly, it is possible to prevent a foreign substance from entering between the sensor detection surface 41a and the detection target portion 36a.

Detection of Seat Position by Slide Position Detection Device

With reference to FIGS. 2 to 4, description will be made below of the detection of the seat position by the above-described slide position detection device 30. FIGS. 2 and 3A described above illustrate the state in which the seat device 10 is located closest to the rear side (−T side) of the vehicle 1. FIG. 4 illustrates the state in which the seat device 10 has been moved from the state of FIG. 2 toward the +T side by the maximum moving distance L, and is located closest to the front side (+T side) of the vehicle 1.

As illustrated in FIGS. 2 and 3A, if the moving distance of the seat device 10 from the −T side toward the +T side is less than the maximum moving distance L, the detection target portion 36a of the vertical wall portion 36 is present on the −B side of the sensor detection surface 41a. In this case, the sensor detection surface 41a and the detection target portion 36a face each other while being separated from each other by a predetermined distance. Thus, the density of the magnetic flux passing through the hall element is maintained at a predetermined value. Therefore, the output from the position sensor 40 is maintained at a predetermined value.

Meanwhile, if the seat device 10 is disposed closest to the +T side, with the moving distance thereof from the −T side toward the +T side having reached the maximum moving distance L, as illustrated in FIG. 4, the detection target portion 36a of the vertical wall portion 36 is absent on the −B side of the sensor detection surface 41a. Herein, the density of the magnetic flux passing through the hall element is different between the presence and absence of the detection target portion 36a on the −B side of the sensor detection surface 41a. Therefore, if the seat device 10 has moved from the −T side toward the +T side by the maximum moving distance L, and is disposed closest to the +T side, the output of the signal from the hall element changes, and the output from the position sensor 40 changes from the above-described predetermined value. Accordingly, it is possible to determine whether or not the seat device 10 is disposed closest to the +T side.

As described above, whether or not the seat device 10 is disposed closest to the +T side is determined on the basis of the output from the position sensor 40, and the physical size of the occupant is estimated. Specifically, the relationship between the seat position and the physical size of the occupant is estimated as follows. The larger the physical size of the occupant is, the more distant from a steering wheel 3 (see FIG. 1) the body of the occupant needs to be disposed. Therefore, the larger the physical size of the occupant is, the closer to the −T side the seat device 10 tends to be disposed. Accordingly, it is possible to estimate that the closer to the −T side the seat device 10 is located, the larger the physical size of the occupant is.

Meanwhile, the smaller the physical size of the occupant is, the closer to the steering wheel 3 the body of the occupant needs to be disposed. Therefore, the smaller the physical size of the occupant is, the closer to the +T side the seat device 10 tends to be disposed. Accordingly, it is possible to estimate that the closer to the +T side the seat device 10 is located, the smaller the physical size of the occupant is. In particular, if the seat device 10 is disposed closest to the +T side, it is possible to estimate the physical size of the occupant to be substantially small. The physical size of the occupant is thus estimated, and the air bag of the air bag device is deployed in a stepwise manner in accordance with the physical size of the occupant in the event of a collision. Accordingly, it is possible to effectively deploy the air bag in accordance with the physical size of the occupant.

According to the present embodiment, the position sensor 40 is disposed on the −B side of the upper rail 21 and on the +B side of the vertical wall portion 36, as illustrated in FIG. 3A. Further, the vertical wall portion 36 extends toward the +H side along the −B side wall portion 27b of the lower rail 25. Therefore, the sensor detection surface 41a of the position sensor 40 is covered from the −H side by the lower rail 25 and the vertical wall portion 36. Thereby, the position sensor 40 does not attract a foreign substance from the surface of the vehicle floor 7. Accordingly, it is possible to prevent a foreign substance from adhering to the position sensor 40 by the use of the lower rail 25 and the vertical wall portion 36, and thus to prevent a foreign substance from entering between the sensor detection surface 41a and the detection target portion 36a.

Further, the +H side end portion of the vertical wall portion 36 is disposed at a position higher than the sensor detection surface 41a of the position sensor 40. It is thereby possible to protect the sensor detection surface 41a of the position sensor 40 from external force acting in the B direction. In particular, the vertical wall portion 36 including the detection target portion 36a is made of a magnetic material, such as iron. It is therefore possible to firmly protect the sensor detection surface 41a of the position sensor 40 from external force acting in the B direction.

The present invention is not limited to the above-described embodiment. The slide position detection device of the present embodiment is provided to the driver's seat. However, the slide position detection device may be provided to the front passenger seat. With this configuration, it is possible to estimate the physical size of the user of the front passenger seat and deploy the air bag of the air bag device in a stepwise manner in the event of a collision.

The slide position detection device of the present embodiment is provided to the inner slide mechanism. However, the slide position detection device may be provided to the outer slide mechanism. There are less foreign substances, however, in the vicinity of the inner slide mechanism, as compared with the vicinity of the outer slide mechanism. Therefore, the present embodiment is advantageous in being capable of effectively preventing a foreign substance from entering between the sensor detection surface and the detection target portion.

In the slide position detection device of the present embodiment, the position sensor is disposed inside the pair of slide mechanisms. However, the position sensor may be disposed outside the pair of slide mechanisms. The inside of the pair of slide mechanisms is, however, located below the seat cushion. Thus, it is considered that there are less foreign substances inside the pair of slide mechanisms. Therefore, the present embodiment is advantageous in being capable of effectively preventing a foreign substance from entering between the sensor detection surface and the detection target portion.

In the slide position detection device of the present embodiment, when the seat device is located closest to the +T side, the detection target portion 36a is separated from the sensor detection surface 41a to make it recognized that the position of the seat device is closest to the +T side. However, the detection target portion 36a may be configured to face the sensor detection surface 41a when the seat device is disposed closest to the +T side, to make it recognized that the position of the seat device is closest to the +T side. In this case, the detection target portion is formed only in a +T side end portion of the vertical wall portion. In the present embodiment, however, the vertical wall portion is formed in a wider range. Therefore, the present embodiment is advantageous in being capable of protecting the sensor detection surface in a wide range.

The position sensor of the present embodiment is a magnetic sensor using a hall element. However, the position sensor is not limited to the magnetic sensor using a hall element, and may be a magnetic sensor using, for example, a magnetoresistive element.

The support plate and the protection plates of the present embodiment are formed integrally with the seat attachment member provided on the upper side of the upper rail. However, the support plate and the protection plates may be formed as separate members from the seat attachment member. The present embodiment is, however, advantageous in being capable of forming the support plate and the protection plates at low cost by forming the plates integrally with the seat attachment member.

The second protection plate of the present embodiment is formed on the +T side of the support plate. In addition to the second protection plate, a third protection plate may be formed on the −T side of the support plate.

The respective shapes of the upper rail, the lower rail, the position sensor, the first protection plate, the second protection plate, the detection target portion, and so forth of the present embodiment are not limited to the shapes according to the embodiment, and may be modified into a variety of shapes.

According to the embodiment of the present invention, a seat slide position detection device for a vehicle (e.g., slide position detection device 30 in an embodiment) includes a lower rail, an upper rail, a detection target portion, and a position sensor. The lower rail (e.g., lower rail 25 in an embodiment) is attached to a vehicle floor (e.g., vehicle floor 7 in an embodiment). The upper rail (e.g., upper rail 21 in an embodiment) is supported relative to the lower rail to be slidable in the longitudinal direction of the lower rail (e.g., T direction in an embodiment). The detection target portion (e.g., detection target portion 36a in an embodiment) is disposed in a predetermined range in the longitudinal direction of the lower rail. The position sensor (e.g., position sensor 40 in an embodiment) is disposed on the side of the upper rail, and has a surface facing the detection target portion and including a sensor detection surface (e.g., sensor detection surface 41a in an embodiment). In the seat slide position detection device for a vehicle, the detection target portion is disposed on one side of the lower rail in the width direction (e.g., B direction in an embodiment), and is provided in a vertical wall portion (e.g., vertical wall portion 36 in an embodiment) extending upward along a side surface of the lower rail on the one side (e.g., −B side wall portion 27b in an embodiment). The position sensor is disposed between the upper rail and the vertical wall portion in the width direction of the lower rail, and has the sensor detection surface disposed at a height allowing the sensor detection surface to face the detection target portion.

According to the embodiment of the present invention, the position sensor is disposed between the upper rail and the vertical wall portion in the width direction of the lower rail. Further, the vertical wall portion extends upward along a side surface of the lower rail on the one side. Therefore, the sensor detection surface of the position sensor is covered from below by the lower rail and the vertical wall portion. Thereby, the position sensor does not attract a foreign substance from the surface of the vehicle floor located below the position sensor. It is therefore possible to prevent a foreign substance from adhering to the position sensor. Accordingly, it is possible to prevent a foreign substance from entering between the sensor detection surface and the detection target portion.

Further, the sensor detection surface is disposed at a height allowing the sensor detection surface to face the detection target portion of the vertical wall portion. With the detection target portion of the vertical wall portion, it is possible to protect the sensor detection surface of the position sensor from external force acting in the width direction.

Further, the seat slide position detection device for a vehicle preferably includes a protection plate (e.g., first protection plate 33a in an embodiment) provided on the side of the upper rail and extending downward along a side surface of the vertical wall portion on the one side of the vertical wall portion. Further, the sensor detection surface, the vertical wall portion, and the protection plate are preferably disposed to be superimposed in a cross section at a predetermined height.

According to the embodiment of the present invention, the sensor detection surface, the vertical wall portion, and the protection plate are preferably disposed to be superimposed in a cross section at a predetermined height. It is therefore possible to protect the sensor detection surface of the position sensor with the vertical wall portion and the protection plate. Thereby, it is possible to reliably protect the sensor detection surface of the position sensor from external force acting in the width direction. Further, the sensor detection surface is preferably covered from above by the protection plate. It is therefore possible to reliably prevent a foreign substance from entering between the sensor detection surface and the detection target portion.

Further, the seat slide position detection device for a vehicle preferably includes a support plate (e.g., support plate 32 in an embodiment) attached to the upper rail and having the position sensor hanging therefrom. Further, the protection plate is preferably formed by a downwardly bent end portion of the support plate on the one side.

According to the embodiment of the present invention, the support plate and the protection plate are preferably formed integrally. Therefore, the cost is lower than in a case having the support plate and the protection plate formed as separate members. Further, it is possible to easily position the protection plate.

Further, the seat slide position detection device for a vehicle preferably includes a second protection plate (e.g., second protection plate 33b in an embodiment) extending downward from at least an end portion of the support plate on one side in the longitudinal direction, and covering the sensor detection surface.

According to the embodiment of the present invention, it is possible to prevent a foreign substance from entering in the longitudinal direction and adhering to the position sensor. Accordingly, it is possible to reliably prevent a foreign substance from entering between the sensor detection surface and the detection target portion.

Obviously, numerous modifications and variations of the present invention are possible in light of the above teachings. It is therefore to be understood that within the scope of the appended claims, the invention may be practiced otherwise than as specifically described herein.

What is claimed is:

1. A seat slide position detection device for a vehicle, comprising:
    a lower rail attached to a vehicle floor and having a longitudinal direction and a width direction substantially perpendicular to the longitudinal direction, the lower rail having a first side and a second side opposite to the first side in the width direction, the first side including a side surface and an upward wall portion extending upward along the side surface;
    an upper rail supported by the lower rail and slidable with respect to the lower rail in the longitudinal direction of the lower rail;
    a detection target portion provided in the upward wall portion of the lower rail in a predetermined range in the longitudinal direction of the lower rail;
    a position sensor disposed at the upper rail between the upper rail and the upward wall portion to face the detection target portion; and
    a protection plate attached to the upper rail and including a downward wall portion extending downward along a first surface of the upward wall portion on the first side of the lower rail,
    wherein the position sensor comprises a magnetic sensor,
    wherein the position sensor has a detection surface to detect whether the detection target portion faces the detection surface, and
    wherein the protection plate is disposed to cover the detection surface and is spaced apart from the detection target portion in the width direction.

2. The seat slide position detection device according to claim 1,
    wherein the protection plate extends downward along the first surface of the upward wall portion that is on a reverse side of a second surface of the upward wall portion on which the detection target portion is provided, wherein the detection surface, the upward wall portion, and the downward wall portion are disposed to be superimposed in a cross section at a predetermined height.

3. The seat slide position detection device according to claim 2, further comprising:

a support plate attached to the upper rail, and having the position sensor hanging from the support plate, wherein the protection plate is attached to the support plate in a vicinity of an end of the support plate in the width direction.

4. The seat slide position detection device according to claim 3, further comprising:

a second protection plate attached to the support plate in a vicinity of at least one end of the support plate in the longitudinal direction, and including a second downward wall portion extending downward so as to cover the detection surface.

5. The seat slide position detection device according to claim 1, wherein a length of the detection target portion in the longitudinal direction is less than a maximum moving distance of a seat device of the vehicle in the longitudinal direction.

6. The seat slide position detection device according to claim 1, wherein the detection surface, the upward wall portion, and the downward wall portion are disposed to be superimposed in a cross section at a predetermined height.

7. The seat slide position detection device according to claim 1, wherein the protection plate is disposed to cover at least a portion of the detection target portion in the width direction.

8. The seat slide position detection device according to claim 1, wherein the upward wall portion is located at a position sandwiched between the protection plate the detection surface in the width direction when the upper rail is slidably positioned on the lower rail such that the position sensor and the detection target portion overlap in the longitudinal direction.

9. A seat slide position detection device for a vehicle, comprising:

a lower rail attached to a vehicle floor and having a longitudinal direction and a width direction substantially perpendicular to the longitudinal direction, the lower rail having a first side and a second side opposite to the first side in the width direction, the lower rail including an upward wall portion extending upward along the first side;

an upper rail supported by the lower rail and slidable with respect to the lower rail in the longitudinal direction of the lower rail;

a detection target portion provided in the upward wall portion of the lower rail in a predetermined range in the longitudinal direction of the lower rail;

a position sensor disposed at the upper rail between the upper rail and the upward wall portion, the position sensor having a detection surface configured to face the detection target portion; and a protection plate attached to the upper rail and including a downward wall portion extending downward along the upward wall portion on the first side of the lower rail, wherein the protection plate is disposed to cover the detection surface and at least a portion of the detection target portion in the width direction when the upper rail is slidably positioned on the lower rail such that the position sensor and the detection target portion overlap in the longitudinal direction.

10. A seat slide position detection device for a vehicle, comprising:

a lower rail attached to a vehicle floor and having a longitudinal direction and a width direction substantially perpendicular to the longitudinal direction, the lower rail having a first side and a second side opposite to the first side in the width direction, the lower rail including an upward wall portion extending upward along the first side;

an upper rail supported by the lower rail and slidable with respect to the lower rail in the longitudinal direction of the lower rail;

a detection target portion provided in the upward wall portion of the lower rail in a predetermined range in the longitudinal direction of the lower rail;

a position sensor disposed at the upper rail between the upper rail and the upward wall portion, the position sensor having a detection surface configured to face the detection target portion; and a protection plate attached to the upper rail and including a downward wall portion extending downward along the upward wall portion on the first side of the lower rail, wherein the upward wall portion is located at a position sandwiched between the protection plate and the detection surface in the width direction when the upper rail is slidably positioned on the lower rail such that the position sensor and the detection target portion overlap in the longitudinal direction.

\* \* \* \* \*